(12) United States Patent
Pallo et al.

(10) Patent No.: US 7,967,162 B2
(45) Date of Patent: *Jun. 28, 2011

(54) DOUBLE-WALLED BLOW-MOLDED CONTAINER INCLUDING AN UNDERCUT FEATURE

(75) Inventors: R. David Pallo, Fairport, NY (US); Kelvin H. Wildman, Honeoye Falls, NY (US); Mark R. Crombach, Sodus, NY (US)

(73) Assignee: John D. Brush & Co., Inc., Rochester, NY (US)

( * ) Notice: Subject to any disclaimer, the term of this patent is extended or adjusted under 35 U.S.C. 154(b) by 1105 days.

This patent is subject to a terminal disclaimer.

(21) Appl. No.: 11/736,880

(22) Filed: Apr. 18, 2007

(65) Prior Publication Data

US 2008/0257233 A1 Oct. 23, 2008

(51) Int. Cl.
*E05G 1/00* (2006.01)
(52) U.S. Cl. ... 220/88.1; 109/45; 220/23.9; 220/560.01; 220/592.2; 220/849
(58) Field of Classification Search ............... 109/45; 220/88.1, 560.01, 849, 23.9, 592.2
See application file for complete search history.

(56) References Cited

U.S. PATENT DOCUMENTS

| 4,101,256 | A | | 7/1978 | White et al. |
|---|---|---|---|---|
| 4,805,290 | A | | 2/1989 | Brush, Jr. et al. |
| 4,828,786 | A | | 5/1989 | Leggs et al. |
| 5,295,447 | A | | 3/1994 | Robbins et al. |
| 5,377,514 | A | * | 1/1995 | Robbins et al. .............. 70/452 |
| 6,752,092 | B2 | | 6/2004 | Beattie et al. |
| 7,101,168 | B1 | | 9/2006 | Willemsen |
| 7,448,513 | B2 | * | 11/2008 | Schafer ..................... 220/826 |
| 7,628,113 | B2 | * | 12/2009 | Pallo et al. .................. 109/75 |

* cited by examiner

*Primary Examiner* — Anthony Stashick
*Assistant Examiner* — Elizabeth Volz
(74) *Attorney, Agent, or Firm* — Woods Oviatt Gilman LLP

(57) ABSTRACT

An undercut for a blow-molded container is provided and may include a top surface, first and second side surfaces, and first and second end surfaces. The side surfaces are connected to the top surface, and the side surfaces may be substantially flat, substantially parallel with one another, and substantially perpendicular with the top surface. The first end surface is connected to the top surface and the side surfaces, and may be positioned at an obtuse angle relative to the top surface. The second end surface is connected to the top surface and side surfaces. The second end surface may include a tip portion and a concave arc portion. The tip portion may be flat and extend from the top surface at an acute angle. The concave arc portion extends from the tip portion and underlies the top surface to form a hook-shaped fastener for attaching an object to the undercut.

14 Claims, 5 Drawing Sheets

DOUBLE-WALLED BLOW-MOLDED CONTAINER INCLUDING AN UNDERCUT FEATURE

FIELD OF THE INVENTION

The present invention generally relates to containers formed by blow molding and, in particular to a double-walled blow-molded fire-resistant safe including an undercut feature that is used for securely attaching an object to the container.

BACKGROUND OF THE INVENTION

Blow molding is a well-known technique for forming articles from thermoplastic resins. For instance, it is known that double-walled containers may be formed by a blow molding process using a series of clamping and holding steps during extrusion of a parison, such as the blow-molded container is shown and described in U.S. Pat. No. 4,828,786 to Legg et al., the disclosure of which is incorporated herein by reference. One such blow-molded double-walled container may be used as a lockable fire-resistant safe for storing documents or other valuables which may be damaged or destroyed by exposure to high temperatures. For example, various types of fire-resistant safes are available from John D. Brush & Co., Inc, d/b/a/Sentry Group, Rochester, N.Y. 14625, USA.

A typical fire-resistant safe includes top and bottom elements that are hingedly coupled to one another to define a storage cavity therebetween. Each of the top and bottom elements are typically blow-molded to form a hollow space formed between inner and outer shells. The hollow space of each element between the shells is filled with a non-combustible, fire-proof thermally-insulating material such as hydrated Portland cement. Some examples of existing fire-resistant safes are disclosed in U.S. Pat. No. 4,805,290 to Brush, Jr. et al., U.S. Pat. No. 5,295,447 to Robbins et al., and U.S. Pat. No. 6,752,092 to Beattie et al., the disclosures of which are hereby incorporated by reference.

It may be desirable in some instances to securely attach an object to either of the top and bottom elements of the fire-resistant safe (e.g., a bungee cord). One way to attach an article to a blow-molded container is to use one or more separate attaching mechanisms that are fastened to the container either before or after the hollow space is filled with fire-resistant insulation. Specifically, a screw or other fastener would be drilled through either the inner or outer shell to secure the attaching mechanism to the container. The object may then be attached to the container using the attaching mechanisms.

This particular solution is problematic in that it requires one or more separate attaching mechanisms to be mounted to the container, which results in an increase in production cost. Moreover, using separate attaching mechanisms with the container lengthens the manufacturing time of the container due to the additional time required to mount the attaching mechanism and the clean-up time that is involved due to the drilling that is required to secure the attaching mechanism to the container.

Another way to attach an article to a blow-molded container is to blow-mold the attaching mechanism, such as an undercut, into the inner or outer shell of the container. Although blow-molding provides a useful method of manufacturing shaped plastic articles, problems are frequently encountered when the article to be formed includes undercuts that extend from the outer surface of the article. In particular, when undercuts are molded into the inner or outer shell of a container using the blow-molding process, the undercut itself tends to lock the article in the mold, thereby hindering or even preventing its removal from the mold.

A variety of approaches have been taken to deal with the problems caused by forming an undercut in a blow-molded container. For example, U.S. Pat. No. 4,101,256 to White et al. describes the use of a blow mold having hinged portions to facilitate removal of a molded product having an undercut feature from the mold. In another example, U.S. Pat. No. 7,101,168 to Willemsen describes the use of a mold that includes a plurality of segments which are movable in a radial direction so that the molded article can be removed from the mold. However, each of the approaches set forth above involve molds utilize a certain amount of mechanization, which increases the manufacturing costs and complicates the molding process.

Accordingly, there exists a need for an undercut feature for a blow-molded double walled container that is formed in the container during the blow molding process, and that is capable of being removed from the blow mold without mechanization. The present invention fills these needs as well as other needs.

SUMMARY OF THE INVENTION

The present invention is directed to an undercut that is integrally formed in a blow-molded container. The undercut includes a top surface, first and second side surfaces connected to the top surface, and first and second surfaces. The first and second side surfaces may be substantially parallel with one another. The first end surface is connected to the top surface and first and second side surfaces. The first end surface is positioned at an obtuse angle relative to the top surface. The second end surface is connected to the top surface and first and second side surfaces. The second end surface includes a tip portion and a concave arc portion. The tip portion is flat and extend from the top surface at an acute angle, and the concave arc portion extends from the tip portion and underlies the top surface thereby forming a hook-shaped fastener for attaching an object to the undercut. The undercut is configured to facilitate its release from a blow mold.

In another aspect of the present invention the undercut may include a substantially flat top surface, first and second side surfaces connected to the top surface, and first and second end surfaces. The first and second side surfaces may be substantially flat and substantially parallel with one another. Further, the first and second side surfaces may be substantially perpendicular with the top surface. The first end surface is connected to the top surface and first and second side surfaces. The first end surface is positioned at a 135 degree angle relative to the top surface. The second end surface is connected to the top surface and first and second side surfaces. The second end surface may include a tip portion and a concave arc portion, wherein the tip portion is flat and extends from the top surface at a 45 degree angle. The concave arc portion extends from the tip portion and underlies the top surface thereby forming a hook-shaped fastener for attaching an object to the undercut.

In yet another aspect of the present invention, one or more of the above-mentioned undercuts may be integrally formed with a container during the blow-molding process. In particular, the container may include a top element, a bottom element, and a hinge joining the top element with the bottom element to enable the top element to be pivoted relative to the bottom element. The top element may include an inner shell and an outer shell, wherein the inner and outer shells are spaced apart to define an insulation cavity. The bottom element includes an inner shell and an outer shell, wherein the inner and outer shells are spaced apart to define an insulation cavity. The at least one undercut is integrally formed in at least one of the top element and the bottom element, wherein the at least one undercut extends outwardly from one of the inner and outer shell.

In a further aspect of the invention, a method of forming one or more of the above-mentioned undercuts is provided. The method of forming the undercut may include: providing an unmechanized blow mold configured in a manner to integrally form the undercut with the wall of the container; positioning a parison over the blow mold to define a molding space between the blow mold and the parison, wherein at least a portion of the molding space defines the shape of the undercut; drawing the parison against the blow mold into the molding space causing the parison to substantially conform to the blow mold to form the undercut; and applying a force to snap the undercut out of the blow mold without mechanization. The parison used in the method may include a thermoplastic resin. In addition, a vacuum may be used to draw the parison against the blow mold into the molding space to form the undercut. At least one vacuum aperture may be defined in the blow mold in the area adjacent to the top surface of the undercut so that the vacuum may draw air out of the molding space through the at least one vacuum aperture,

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing wherein.

DETAILED DESCRIPTION OF THE INVENTION

Figure 1:
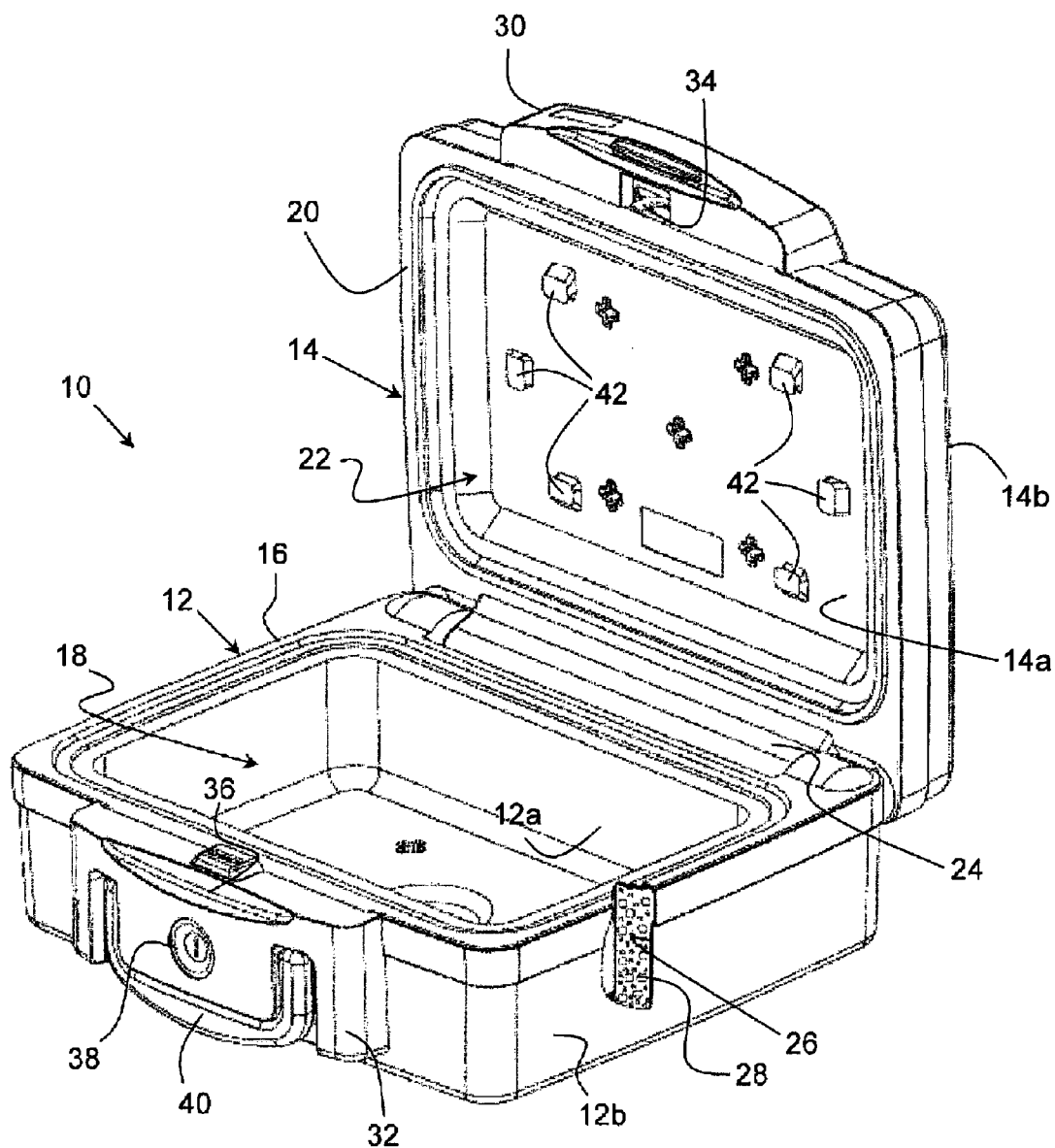
FIG. 1 is a perspective view of the a fire-resistant safe with a portion broken away including a plurality of undercuts in accordance with the present invention.

Referring to the drawings in detail, and specifically to FIG. 1, a blow-molded double-walled fire-resistant container or safe is provided in accordance with one embodiment of the present invention an is designated with reference numeral 10. Safe 10 generally includes a bottom element 12 and a top element 14, wherein each of bottom and top elements 12, 14 are formed by blow-molding thereby providing an inner shell 12a, 14a and an outer shell 12b, 14b, respectively. Inner shell 12a and outer shell 12b of bottom element 12 are formed to provide an upper edge 16, and inner shell 12a defines a first compartment 18 for the storage of valuables. Inner shell 14a and outer shell 14b are formed to provide a lower edge 20 that is configured to oppose lower edge 16. Inner shell 14a further defines a second compartment 18.

A hinge 24 may be used to join top element 14 and bottom element 12 thereby enabling top element 14 to be pivoted relative to bottom element 12 to move between an opened position as shown in FIG. 1 and a closed position so that upper edge 16 and lower edge 20 are in contact with one another. It will be understood that safe 10 may also include water-resistant features to protect the contents of the items being stored therein. For example, safe 10 may include a gasket positioned at the interface between upper and lower edges 16, 20 to entirely or substantially prevent water from entering first or second compartments 18, 22 of safe 10 when top and bottom elements 12, 14 are in the closed position. For example, safe 10 may include the water-resistant features as shown and described in Sentry's U.S. Pat. No. 6,752,092, which is hereby incorporated by reference in its entirety.

An insulation cavity 26 is defined between inner shell 12a and outer shell 12b of bottom element 12, and another insulation cavity is defined between inner shell 14a and outer shell 14b of top element 14. A thermally insulating fire-resistant material 28 is disposed in insulation cavity 26 between inner shells 12a, 14a and outer shells 12b, 14b of top and bottom elements 14, 12. The thermally insulating material may be a hydrated Portland cement. In addition, the fire-resistant material that may be used in the insulation cavities may include, but is not limited to, one or more of an insulative mineral wool, a sodium silicate intumescent material, and insulation that is described in Sentry's U.S. Pat. No. 4,645,613, which is hereby incorporated by reference in its entirety. The inner shells 12b, 14b and outer shells 12a, 14a of top and bottom elements 14, 12 may be formed of a polymeric resin, for example, high density polyethylene (HDPE), that has a melting point higher than the boiling point of water. The water of hydration thus prevents the inner and outer shells, especially the outer shells, from melting or igniting for an extended period of time.

Safe 10 may further include an upper escutcheon plate 30 extending outwardly from top element 14 and anchored within the insulation located within the cavity formed between inner and outer shells 14a, 14b. Safe 10 may also include a lower escutcheon plate 32 extending outwardly from bottom element 12 and anchored within insulation 28 located within insulation cavity 26 formed between inner and outer shells 12a, 12b. A corresponding pair of latch elements 34 and 36 are mounted within escutcheon plates 34, 36 and may be used to maintain top and bottom elements 12, 14 in a closed position. Specifically, a locking mechanism 38 is used to engage latch element 36 with latch element 34 so that top element 14 is securely fastened to bottom element 12 thereby securing any valuables contained within compartments 18, 22 of safe 10. A handle 40 may also be provided on safe 10.

In accordance with the present invention, safe 10 may include a plurality of undercuts 42 integrally formed with inner shell 14a of top element 14 during the blow molding process. In other words, inner shell 14a and undercuts 42 are essentially one continuous element so that undercuts 42 are actually a formed as a part of top element 14. The undercuts 42 may be formed of the same material as inner shell 14a of lid 14, which may be a thermoplastic resin such as high density polyethylene.

Figure 2:
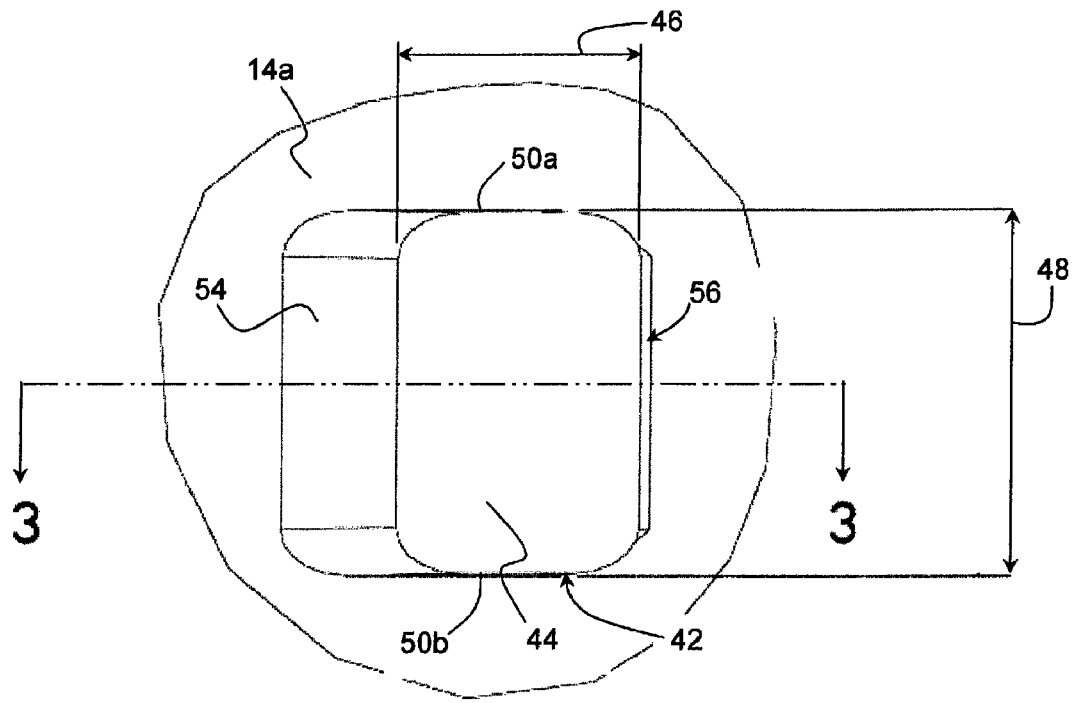
FIG. 2 is a top view of one of the undercuts shown in FIG. 1.
Figure 3:
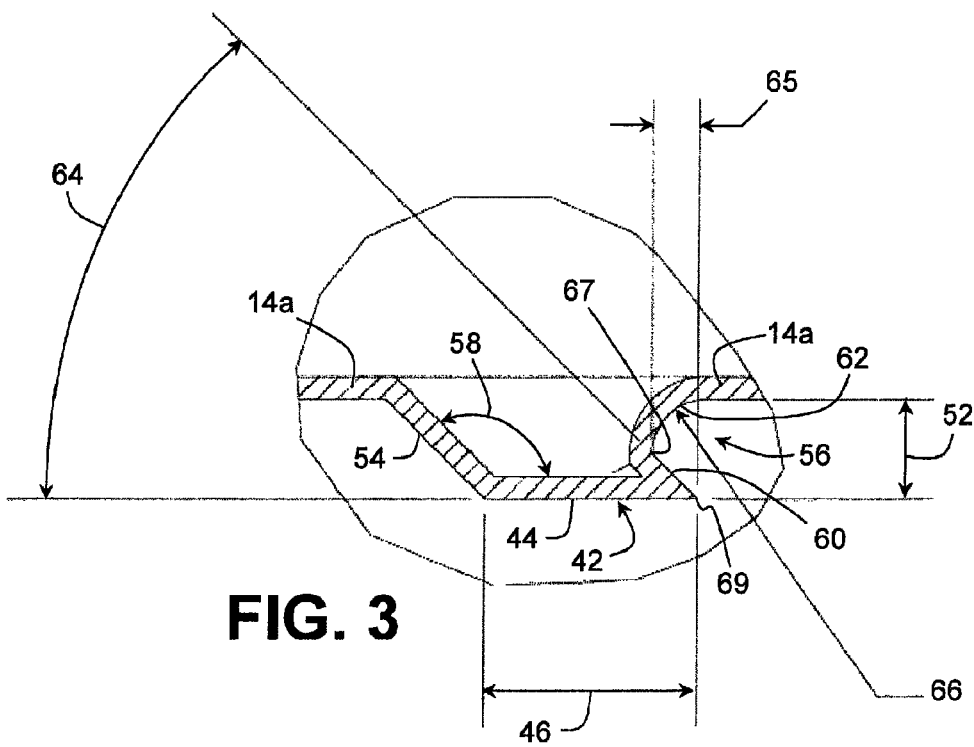
FIG. 3 is a cross-sectional view of the undercut shown in FIG. 2 taken along line 3-3.

As best seen in FIGS. 2 and 3, undercut 42 may include a substantially flat top surface 44 having a length 46 and a width 48. As an example, the length 46 of the top surface 44 may be approximately 0.465 inches and the width 48 of top surface 44 may be approximately 0.700 inches. Undercut 42 may further include substantially flat parallel side surfaces 50a, 50b that extend perpendicularly from inner shell 14a and are connected to top surface 44. Side surfaces 50a, 50b may be substantially perpendicular to top surface 44. Side surfaces 50a, 50b may extend outwardly from inner shell 14a to a height 52 of 0.220 inches, for example.

Undercut 42 may further include a first end surface 54 and a second end surface 56. First end surface 54 may be substantially flat and is connected to both side surfaces 50b, 50b and top surface 44. Further, first end surface 54 preferably forms an obtuse angle 58 with top surface 44. For example, obtuse angle 58 may be 135 degrees. As best seen in FIG. 3, second end surface 56 may include both a tip portion 60 and a concave arc portion 62. Tip portion 60 is generally flat and extends from top surface 44 toward inner surface 14a at an acute angle 64 relative to top surface 44, for example, at an angle of 45 degrees. At point located between top wall 44 and inner shell 14a, tip portion 60 ends and concave arc portion 62 begins, wherein concave arc portion 62 extends from tip portion 60, underlies top surface 44, and is integrally formed with inner shell 14a. For example, concave arc portion 62 may have a radius of curvature 66 of approximately 0.120 inches. It will also be understood that second end surface 56 may only include a concave portion that extends from the top surface to the shell of the container.

With specific reference to FIG. 3, second end surface 56 thereby defines an overhang or hook-shaped fastener which may be used for a variety of purposes. The overhang provided by second end surface 56 has an overhang distance 65 defined between an inward most portion 67 of second end surface 56 and an edge 69 of tip portion 60. In the example shown in FIG. 3, the overhang distance 65 is 0.100 inches. In the example shown in FIG. 3, inward most portion 67 is the junction of tip portion 60 and concave portion 62. In addition, the height of the overhang is approximately equal to the sidewall height 52.

Depending on the intended use, a multiplicity of undercuts 42 may be arranged in a variety of configurations, one of which is illustrated in FIG. 1. Pairs of opposed undercuts may be used in connection with bungee cords for immobilizing items placed within safe 10. Arrays of undercuts 42 may also be used, for example, to hold computer discs, or may serve as attachment members for waterproofing liners or shock absorbing pads.

Figure 4:
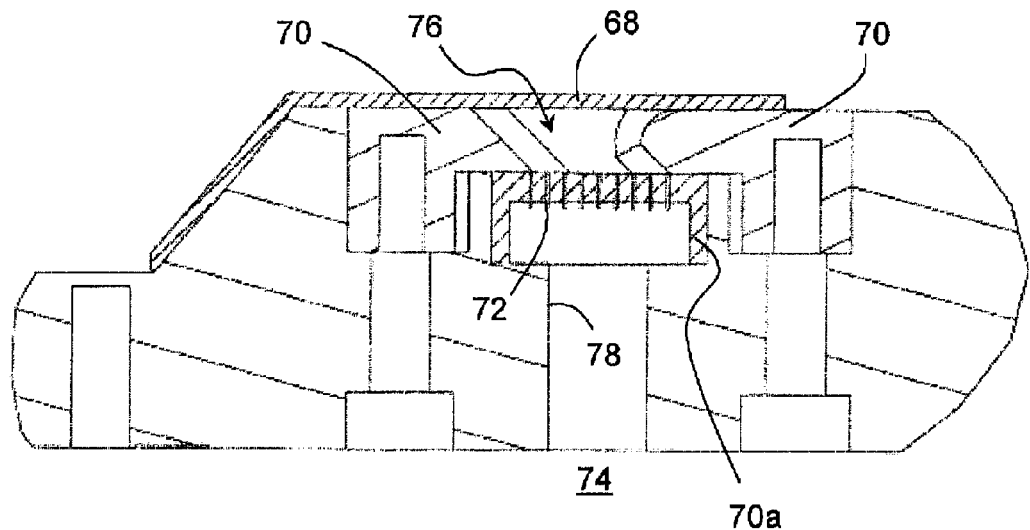
FIGS. 4-6 are cross-sectional views illustrating the steps of blow molding the undercut shown in FIGS. 2 and 3 using a blow mold.
Figure 5:
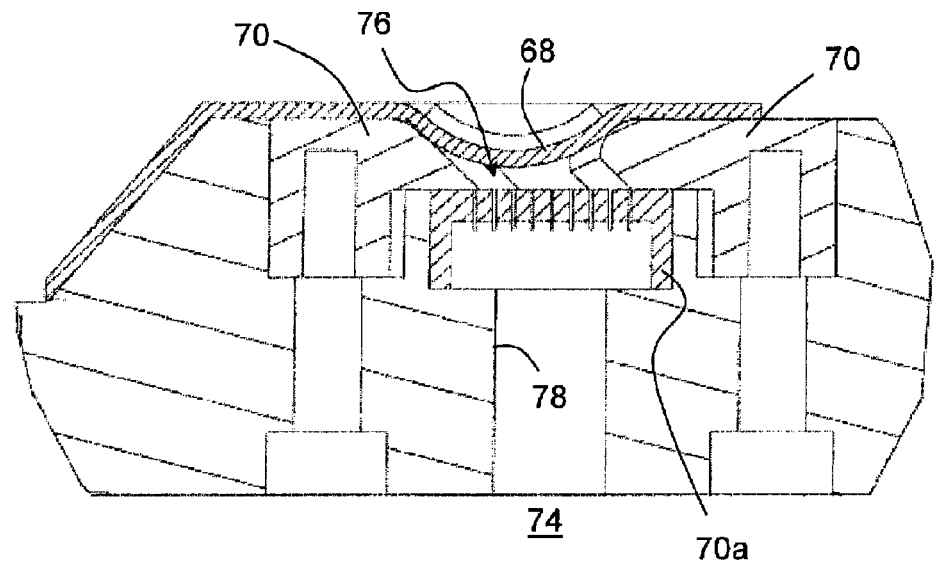
Figure 6:
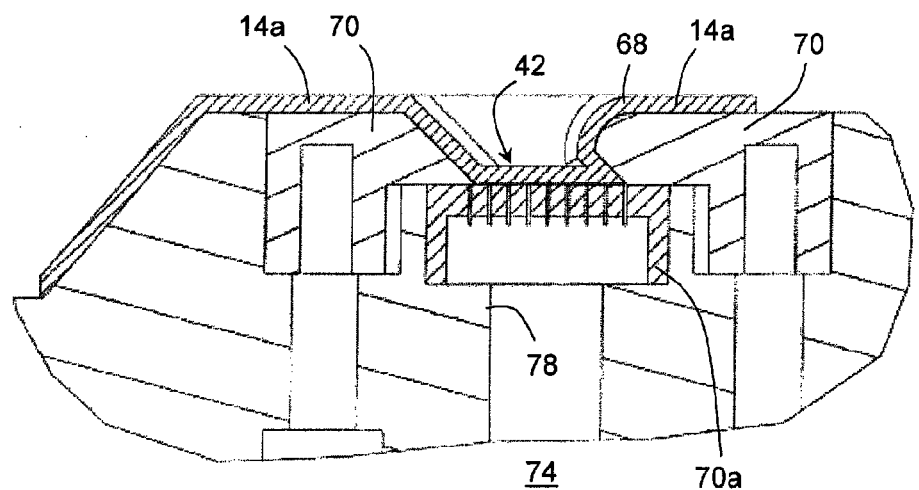
Figure 7:
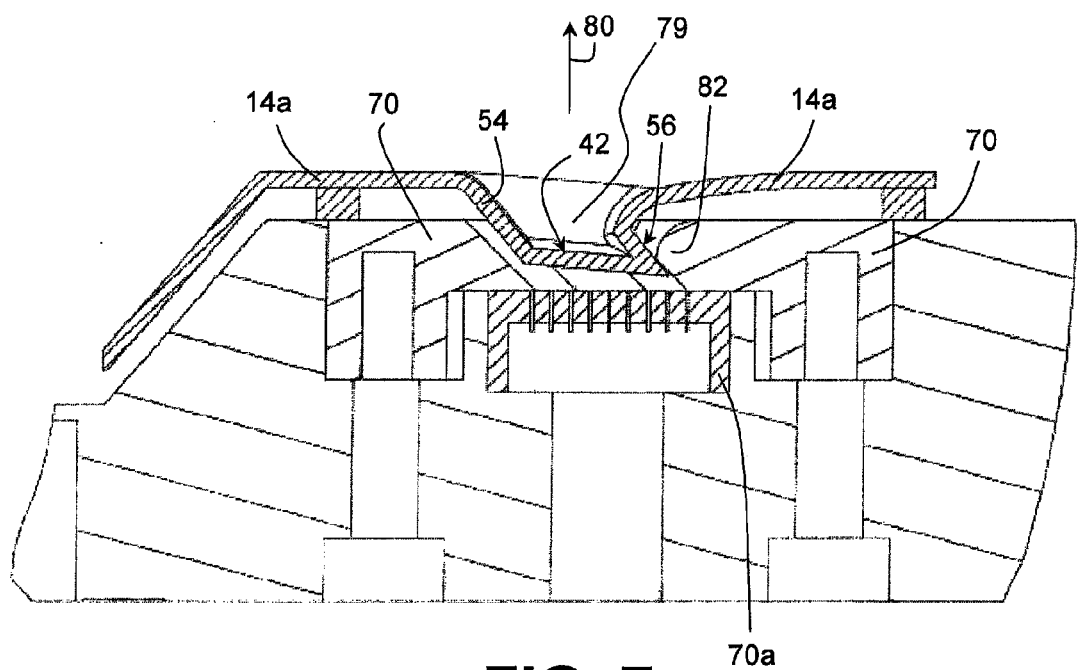
FIG. 7 is a cross-sectional view illustrating the undercut being removed from the blow mold after the steps shown in FIGS. 4-6.

FIGS. 4-7 are a progression of cross-sectional views illustrating a method of blow molding undercut 42 in inner shell 14a of safe 10. In particular, FIG. 4 depicts a parison of softened thermoplastic resin 68, such as high density polyethylene, is positioned over a blow mold 70 that is configured in a manner to shape parison 68 into undercut 42. A portion 70a of blow mold 70 includes at least one vacuum aperture formed therein in the area adjacent to where the top surface of undercut 42 will be formed. When a vacuum from a vacuum source 74 is turned on, air is removed from a molding space 76, defined by parison 68 and blow mold 70 in the shape of undercut 42, through vacuum apertures 72 and out of an outlet 78 formed in blow mold 70 so that parison 40 is drawn into molding space 76, as best seen in FIG. 5. As best seen in FIG. 6, the air being removed through vacuum apertures 72 by vacuum source 74 causes parison 40 to substantially conform to the shape of blow mold 70 as the applied vacuum is further increased. After parison 68 has been fully formed to provide undercut 42 in inner shell 14a, the vacuum is then turned off. As best seen in FIG. 7, undercut 42 is then released from blow mold 70 by applying a force to molded inner shell 14a and undercut 42 in a direction 80 without mechanization so that undercut 42 is snapped out of or otherwise removed from blow mold 70. In contrast, blow mold 70 may also be released from undercut 42 by applying a force in an opposite direction to pull blow mold 70 off of undercut 42, which will achieve the same result. After lid 14 is formed, the insulation cavity, which includes a hollow space defined by undercut 42, may be filled with fire-resistant insulation material to increase the rigidity of undercut 42.

Undercut 42 is a feature that might be expected to present an undercut problem that would hinder its removal from blow mold 70, however the configuration of undercut 42 provides the surprising result of enabling its ready release from blow mold 70 without the need for a mechanized molding device. In particular, undercut 42 may be readily removed from blow mold 70 given the orientation of side surfaces 50a, 50b, which create a minimal amount of resistance when removing undercut 42 from blow mold 70. The angular relationship of first end surface 54 relative to top surface 44 is also advantageous in removing undercut 42 from blow mold 70. In particular, when undercut 42 is removed from blow mold 70, the angular relationship of first end surface 54 relative to top surface 44 prevents any significant generation of resistance between first end surface 54 and blow mold 70 as second end surface 56 is riding along a mold lip 84. The configuration of second end surface 56 also contributes to the release of undercut 42 from blow mold 70 in that its overhang distance in proportion to the height of the overhang, along with the shape of second end surface 56, particularly concave arc portion 62, allows undercut 42 to be slightly bent and snapped out of blow mold 70 without permanently deforming or damaging undercut 42.

Not only does the configuration of undercut 42 facilities its removal from blow mold 70, the second end surface 56 of undercut 42 provides a solid hook-shaped profile for fastening various types of objects to safe 10. Given that undercut 42 is integrally formed with inner shell 14a, the undercut 42 along with inner and outer shells 14a, 14b define insulation cavity 26. Therefore, undercut 42 will be filled with fire-resistant insulation 28, which will increase the strength and rigidity of undercut 42. Moreover, by blow-molding undercut 42 so that it is integral with inner shell 14a, the undercut is formed in safe 10 at a minimal cost and labor and eliminates the drawbacks that are present when separate attachment fasteners are mounted to a safe.

Figure 8:
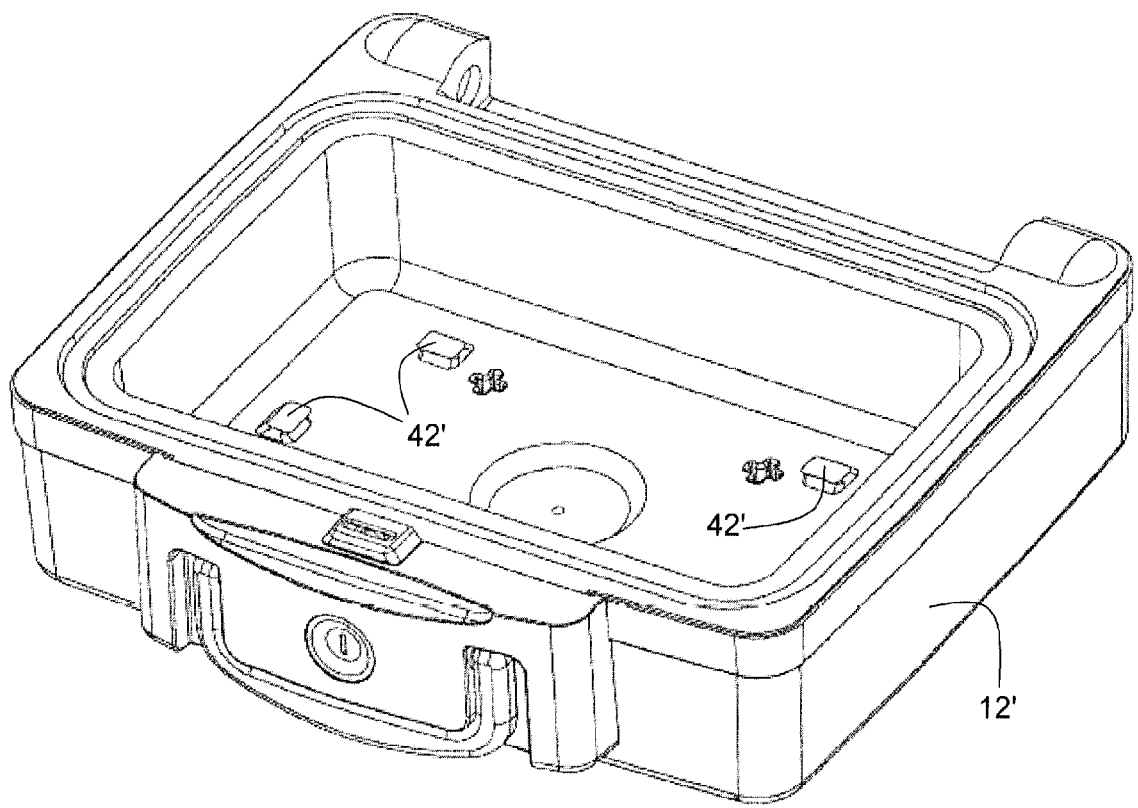
FIG. 8 is a perspective view of a bottom element of the fire-resistant safe having a plurality of undercuts formed therein.

While undercuts 42 are depicted in FIG. 1 as being included in top element 14, it will be understood that the present invention also contemplates forming undercuts 42' in bottom element 12' as best seen in FIG. 8, as well as in both top and bottom elements 12, 14. Furthermore, while undercuts 42 are depicted in FIG. 1 as being included in an inner shell of the container, it will be understood that the present invention also contemplates forming undercuts 42 in an outer shell, such as outer shells 12a, 14a, as well as in both inner and outer shells 12a, 14a.

In addition, it will be understood that one or more undercuts may be blow-molded into top element 14 and/or bottom element 12, and the six undercuts 42 are shown in FIG. 1 is shown merely as an example.

The invention has been described in detail for the purpose of illustration, but it is understood that such detail is solely for that purpose, and variations can be made by those skilled in the art without departing from the spirit and scope of the invention, which is defined by the following claims.

What is claimed:

1. An undercut for a blow-molded container, the undercut comprising:
   a top surface;
   first and second side surfaces connected to the top surface, wherein the first and second side surfaces are substantially parallel with one another;

a first end surface connected to the top surface and first and second side surfaces, wherein the first end surface is positioned at an obtuse angle relative to the top surface; and a second end surface connected to the top surface and first and second side surfaces, wherein the second end surface includes a tip portion and a concave arc portion, wherein the tip portion is flat and extends from the top surface at an acute angle relative to the top surface, and wherein the concave arc portion extends from the tip portion and underlies the top surface thereby forming a hook-shaped fastener for attaching an object to the undercut, wherein the undercut is configured to facilitate its removal from a blow mold.

2. An undercut for a blow-molded container, the undercut comprising:

a substantially flat top surface;

first and second side surfaces connected to the top surface, wherein the first and second side surfaces are substantially flat and substantially parallel with one another, and wherein the first and second side surfaces are substantially perpendicular with the top surface;

a first end surface connected to the top surface and first and second side surfaces, wherein the first end surface is positioned at a 135 degree angle relative to the top surface; and a second end surface connected to the top surface and first and second side surfaces, wherein the second end surface includes a tip portion and a concave arc portion, wherein the tip portion is flat and extends from the top surface at a 45 degree angle relative to the top surface, and wherein the concave arc portion extends from the tip portion and underlies the top surface thereby forming a hook-shaped fastener for attaching an object to the undercut, wherein the undercut is configured to facilitate its release from a blow mold.

3. A blow-molded safe comprising:

a top element including an inner shell and an outer shell, wherein the inner and outer shells are spaced apart to define an insulation cavity;

a bottom element including an inner shell and an outer shell, wherein the inner and outer shells are spaced apart to define an insulation cavity;

a hinge joining the top element with the bottom element to enable the top element to be pivoted relative to the bottom element; and at least one undercut integrally formed in at least one of the top element and the bottom element, the at least one undercut extending outwardly from one of the inner and outer shell, the at least one undercut including:

a top surface;

first and second side surfaces connected to the top surface and extending outwardly from the one of the inner and outer shell, wherein the first and second side surfaces are substantially parallel with one another;

a first end surface connected to the top surface, first and second side surfaces, and extending from the one of the inner and outer shell, wherein the first end surface is positioned at an obtuse angle relative to the top surface; and a second end surface connected to the top surface, first and second side surfaces, and extending from the one of the inner and outer shell, wherein the second end surface includes a tip portion and a concave arc portion, wherein the tip portion is flat and extends from the top surface at an acute angle relative to the top surface, and wherein the concave arc portion extends from the tip portion to the one of the inner and outer shell thereby forming a hook-shaped fastener for attaching an object to the undercut.

4. A blow-molded safe in accordance with claim 3, wherein the top surface is substantially flat.

5. A blow-molded safe in accordance with claim 3, wherein each of the first and second side surfaces are substantially flat.

6. A blow-molded safe in accordance with claim 3, wherein each of the first and second side surfaces is substantially perpendicular with the top surface.

7. A blow-molded safe in accordance with claim 3, wherein the obtuse angle is approximately 135 degrees.

8. A blow-molded safe in accordance with claim 3, wherein the acute angle is approximately 45 degrees.

9. A blow-molded safe in accordance with claim 3, wherein the at least one undercut is configured to facilitate its removal from a blow mold.

10. A blow-molded safe in accordance with claim 3, wherein the at least one undercut is formed from a thermoplastic resin.

11. A blow-molded safe in accordance with claim 3, wherein a fire-resistant insulation material is positioned in the insulation cavities defined in the top element and the bottom element.

12. A blow-molded safe in accordance with claim 3, wherein the at least one undercut is integrally formed in the at least one of the top element and the bottom element during the blow molding process.

13. A blow-molded safe in accordance with claim 3, further comprising a lock for selectively fastening the top element to the bottom element.

14. An undercut for a blow-molded container, the undercut comprising:

a planar top surface;

first and second side surfaces connected to the top surface, wherein the first and second side surfaces are substantially parallel with one another;

a first end surface connected to the top surface and first and second side surfaces, wherein the first end surface is positioned at an obtuse angle relative to the top surface; and a second end surface connected to the top surface and first and second side surfaces, wherein the second end surface includes a tip portion and a concave arc portion, wherein the tip portion is flat and extends from the top surface at an acute angle relative to the top surface, and wherein the concave arc portion extends from the tip portion and underlies the top surface thereby forming a hook-shaped fastener for attaching an object to the undercut.

* * * * *